Patented May 12, 1953

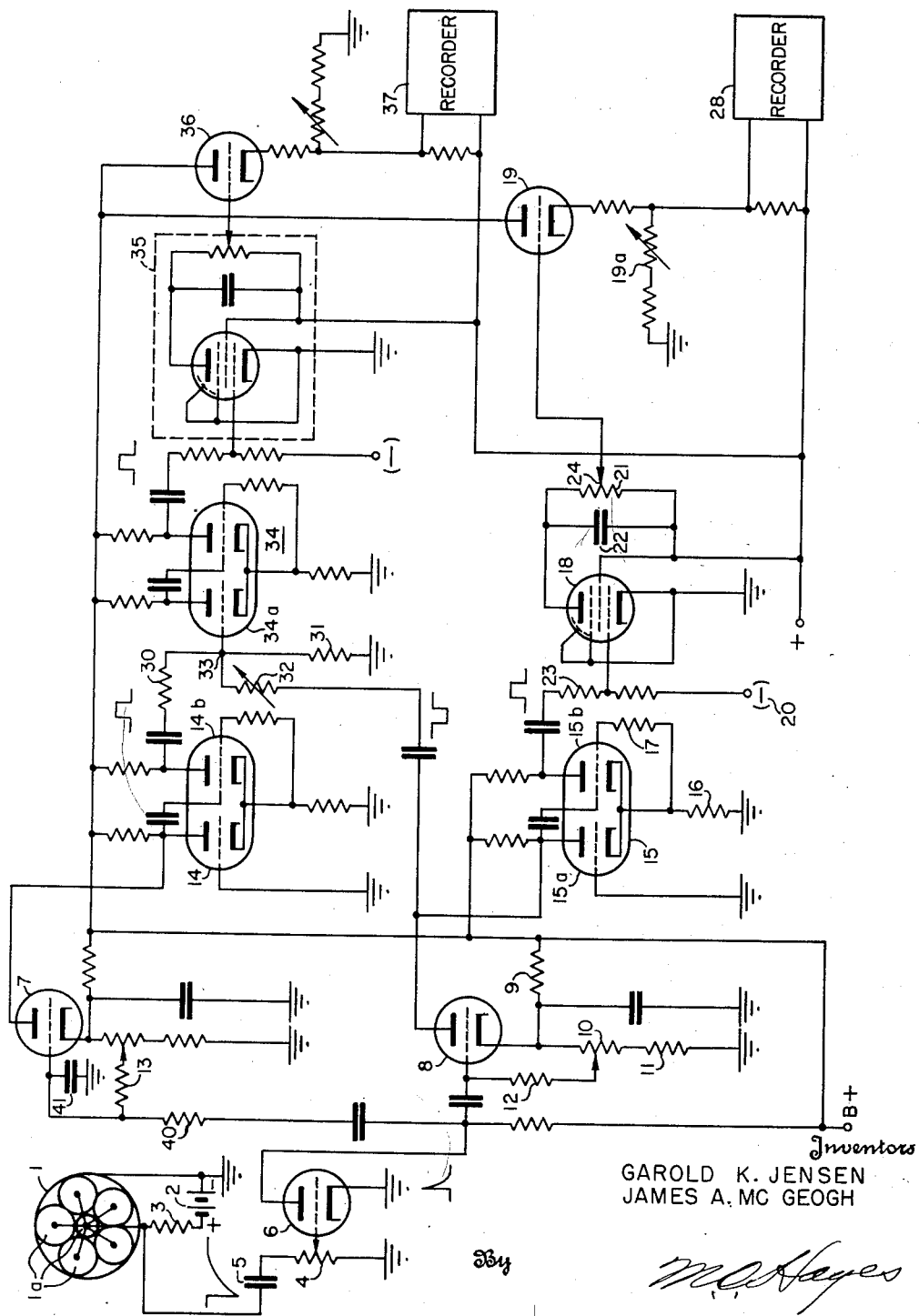

2,638,273

UNITED STATES PATENT OFFICE 2,638,273

DUAL-CHANNEL COUNTING RATE METER

Garold K. Jensen, Pinecrest, Va., and James E. McGeogh, Silver Spring, Md.

Application October 18, 1949, Serial No. 122,072

2 Claims. (Cl. 235—92)

(Granted under Title 35, U. S. Code (1952), sec. 266)

This invention relates in general to frequency meters and in particular to a device for separately indicating, according to pulse amplitude, the frequency of the different amplitude pulses derived from a single variable amplitude pulse source.

This invention is particularly suitable for use in radio activity detectors of the type that employ a plurality of Geiger-Müller tubes connected in parallel. In this type of detector cosmic, or hard gamma radiation, will ionize, in general, more than one Geiger-Müller tube at a time to thus produce a proportionately high amplitude output pulse; whereas soft gamma radiation will, in general, ionize only one Geiger-Müller tube at a time to thus produce a low amplitude output pulse. To reproduce the action of the counter tubes and to provide an analytical interpretation of the composition of the radio active field being detected it is of course desired to separately record the soft and hard gamma counts detected by the Geiger-Müller tubes.

It is accordingly an object of this invention to provide a frequency meter suitable for this purpose.

It is another object of this invention to provide a dual channel frequency meter wherein the frequency of electrical pulses above a given amplitude is indicated in one channel and the frequency of electrical pulses below a given amplitude is simultaneously indicated in a separate channel.

Other objects and features of the present invention will become apparent upon a careful consideration of the following description when taken together with the accompanying drawings the single figure of which illustrates in schematic form a single exemplary embodiment of the invention.

Referring now in particular to the drawings the variable amplitude pulse source is preferably a radio activity detection unit indicated in general at 1, which comprises a plurality of Geiger-Müller tubes 1a connected in parallel. The Geiger-Müller tubes are supplied with a source of operating potential 2 through a common load resistance 3 connected to their anodes in parallel.

In operation, soft gamma radiation impinging on the bank of Geiger-Müller tubes will, in general, cause only one of the tubes to ionize thus producing a small voltage pulse across resistance 3. Hard gamma radiation impinging on the bank of tubes, however, will in general cause two or more tubes to ionize resulting in the development of a voltage pulse across resistance 3 two or more times greater in amplitude than that produced by soft gamma ionization.

The output pulse from the counter bank 1 is negative and is fed through resistance capacitance coupling circuit comprising potentiometer 4 and capacitance 5 to the grid of amplifier 6 where the signal is amplified, inverted and applied in parallel to two channels including tubes 7 and 8. The capacitance 5 and potentiometer 4 are preferably proportioned to provide a differentiating action whereby the relatively long duration output pulse from the counter bank 1 can be converted into a short duration pulse before it is applied to the two tubes 7 and 8.

Tubes 7 and 8 are biased to operate as threshold keyers. In particular tube 8, for example, has its cathode raised above ground potential by the connection thereof to the junction point of resistances 9 and 10 in the voltage divider network which comprises resistances 9, 10 and 11 connected between B+ and ground. The grid of tube 8 is returned through resistance 12 to the movable tap on resistance 10 where the bias on the tube is adjusted. In operation, the bias on tube 8 is adjusted by the tap on resistance 10 so that only those input pulses exceeding a predetermined amplitude and corresponding to the pulses produced by the counter bank when ionized by hard gamma radiation, will be amplified. Tube 7 is similarly connected and biased except that the tap on potentiometer 13 is adjusted so that lower amplitude output pulses corresponding to those produce when the counter bank 1 is ionized by soft gamma radiation will be amplified as well as the larger amplitude pulses.

The outputs from the threshold keyers 7 and 8 are applied to a pair of corresponding pulse shaping networks which in this instance are represented by single stability multivibrator stages 14 and 15. The multivibrator stages 14 and 15 are similar in construction. These stages function to convert the output pulses from the corresponding threshold keyers 7 and 8 into pulses of uniform amplitude and duration for reasons soon to become apparent. As typified by stage 15 each multivibrator comprises a pair of discharge paths 15a and 15b the cathodes of which are connected to ground through a common resistor 16. The right hand tube of each multivibrator is provided with zero bias by returning its grid to the cathode via resistance 17 while the left hand tube is biased to cut-off by returning its grid directly to ground. With this connection the single stable state of the multivibrator exists when the right tube is conducting and the left hand tube is non-conducting. The unstable state of the multivibrator stages is initiated by an output pulse from its respective threshold keyers 7 and 8. Once this state is initiated it persists for a predetermined period of time in dependence on the time constant of the circuit. Thereafter the multivibrator automatically returns to its stable state and remains there until again keyed by an output from its respective threshold amplifier. In general the unstable state of the multivibrator is adjusted to persist for a period considerably less than the shortest recurrence period of the output from the detector unit 1.

The ouput from multivibrator stage 15 which is a positive pulse of uniform duration and amplitude as taken from the plate of the right hand 15b tube and applied to an integrator network including tube 18 and then through a vacuum tube voltmeter 19 to an indicating instrument such as an Esterline-Angus recorder 28. Recorder 28 could equally well be a milliammeter or other current indicating device suitably calibrated to indicate frequency.

Tube 18 is as shown preferably a pentode, grid biased by source 20 to a non-conducting condition with a long time constant parallel resistance 21 and capacitance 22 network disposed in its plate circuit. The positive multivibrator pulse obtained from tube 15b is of an amplitude which assures, during its presence, saturation of tube 18. Since the input pulse to tube 18 is of uniform duration and amplitude, therefore the voltage drop across resistance 21 varies in proportion to the repetition rate of the input pulse. To prevent excessive overloading of the multivibrator 15 a grid limiting resistance 23 is inserted between the grid of tube 18 and the output of the multivibrator.

The voltage drop across output resistance 21 is then metered and is a direct indication of the repetition rate of the pulses passed by tube 8. Resistance 21 has a movable tap 24 from which the metering circuit is fed so that adjustment of tap 24 can be made to provide full scale deflection of the recorder for any given counting rate, varying from say 10 to 50 pulses per second. Variable resistance 19a disposed in the cathode circuit of tube 19 is added to permit a zero adjustment for the recorder 28.

In operation, then it will be seen that high amplitude pulses produced by ionization of the detector unit 1 by hard gamma radiation are passed by threshold keyer 8 and key multivibrator 15 to thus produce an indication at recorder 28 corresponding to the hard gamma count. Tube 7, however, being biased by a less amount passes pulses produced either by hard or soft gamma radiation and hence multivibrator 14 operates at a rate corresponding to the total radiation count. Therefore and for the purposes of obtaining a count proportional to the soft gamma radiation alone, the hard gamma count as registered by multivibrator stage 15 must be subtracted from the total count as registered by stage 14. This is accomplished by taking negative pulses from the plate of the left hand tube of multivibrator 15 and mixing them with the positive pulses of stage 14 obtained from the right hand tube 14b. To this end the positive pulses from right hand tube 14b are fed through a voltage divider network comprising resistances 30 and 31, while the negative pulses from the left hand tube 15a of stage 15 are fed to the voltage divider network comprising variable resistance 32 and resistance 31. Resistance 32 is adjusted so that simultaneous positive and negative pulses reaching point 33 are cancelled out. The resulting pulses appearing at point 33 are applied to the grid of the non-conducting tube 34a of the single stability multivibrator stage 34. This multivibrator is substantially identical to stage 15 and its positive output is applied to an integrating network 35 similar to 18 and thence through a vacuum tube voltmeter 36 to a separate indicating recorder 37.

Thus since point 33 is connected to the non-conducting tube of multivibrator stage 34 only the positive pulses appearing at point 33 are operative to produce output pulses from this stage. And further since no positive pulses can exist at point 33 except in the absence of an output from tube 15a of stage 15 only the soft gamma count will be recorded at 37.

To further assist in complete cancellation of the simultaneous pulses appearing at point 33 the output pulses from stage 15 are made slightly greater in duration than the pulses from multivibrator 14. In addition and to further assure that the leading edges of the pulses appearing at 33 are accurately aligned, the input to threshold keyer 7 includes an integrating network comprising resistance 40 and capacitance 41. This circuit is desirable since the leading edge of any pulse has a finite rise time which when fed to two differently biased tubes such as 7 and 8 would cause the tube with the lesser bias to conduct first. Therefore and to avoid this action the tube 7, which has the lesser bias, is equipped with an integrating circuit 40, 41 in its grid circuit.

In conclusion it should be pointed out that while we have specifically shown the use of multivibrators 14, 15 and 34 for use in pulse shaping any other suitable pulse forming network or transmission channel can be substituted therefor. Also any other alternate counting rate circuit can be substituted for the integrator recorder circuits herein used for measuring the pulse rates of the pulse forming networks. Accordingly and although we have shown only one specific embodiment of the present invention it must be understood that we are fully aware of the many modifications possible thereof and therefore this invention is not to be restricted except insofar as is consistent with the scope of the disclosure given herein.

The invention described herein may be manufactured and used by or for the Government of the United States of America for governmental purposes without the payment of any royalties thereon or therefor.

What is claimed is:

1. A frequency meter for separately indicating electrical signals above and below a given amplitude and produced by a single pulse source, comprising a first amplifier coupled to said source and biased to pass only the impulses produced thereby above said given amplitude, a second amplifier biased to pass signals both above and below said given amplitude, a time delay circuit coupling said source to said second amplifier operative to synchronize the output leading edges of the high amplitude pulses translated by both of said amplifiers, a first pulse generator fed by said first amplifier operative responsive to an output signal therefrom to produce an output pulse of finite width, a second pulse generator fed by said second amplifier operative responsive to a signal therefrom to produce an output pulse of lesser width than the pulse from said first pulse generator, a third pulse generator fed by said second pulse generator and operative responsive to an output therefrom for producing an impulse of fixed duration, means coupled to said third pulse generator and responsive to an output from said first generator to block operation of said third generator during an output pulse from said first generator, and indicating means fed by said first and third pulse generators for separately indicating the respective output frequencies.

2. In combination, a radio activity detection unit comprising a plurality of Geiger-Müller tubes connected in parallel to a common load to produce low amplitude output pulses in response to the activation of a single Geiger-Müller tube by the reception of soft gamma radiation and high amplitude output pulses in response to the activation of a plurality of Geiger-Müller tubes by the reception of hard gamma radiation, and a frequency counter for separately indicating the frequencies of the high and low impulses, comprising a first biased amplifier coupled to said common load and biased to translate only the high amplitude pulses appearing across said load, a second amplifier biased to translate both the high and low amplitude pulses, a time delay circuit coupling the pulses appearing across said load to said second amplifier operative to synchronize the leading edges of the pulses translated by both amplifiers, a first transmission path fed by said first amplifier operative to deliver output pulses in response to and at the same frequency as the high amplitude pulses passed thereby, a second transmission path fed by said second amplifier operative to deliver output pulses in response to and at the same frequency as both the high and low amplitude pulses passed thereby, means connected between the first and second transmission paths responsive to the occurrence of a signal in said first path for blocking the operation of said second path, and indicating means fed by said first and second transmission paths for separately indicating the respective output frequencies thereof.

GAROLD K. JENSEN.
JAMES E. McGEOGH.

References Cited in the file of this patent

UNITED STATES PATENTS

| Number | Name | Date |
|---|---|---|
| 2,435,579 | Francis | Feb. 10, 1948 |
| 2,486,390 | Cunningham | Nov. 1, 1949 |

OTHER REFERENCES

Review of Scientific Instruments, vol. 18, No. 2, February 1947, pages 90–100 inclusive; "A Pulse Analyzer for Nuclear Research," Freundlich et al.

Review of Scientific Instruments, vol. 18, No. 10, October 1947, pages 706–715; "The Model 200 Pulse Counter," Higinbotham et al.

Nucleonics, March 1948, pages 16–36, inclusive; "Electronics for the Nuclear Physicist, II," Elmore.

"Electronic Classifying, Cataloging, and Counting Systems," Parsons; published by Technical Information Div., Oak Ridge Directed Operations, Oak Ridge, Tennessee, pages 1–7, inclusive.